March 14, 1967 — R. A. LONG ETAL — 3,308,532

METHOD AND FILLINGS FOR EXOTHERMIC BRAZING

Filed July 29, 1963 — 2 Sheets-Sheet 1

ROGER A. LONG
ROBERT A. CAUGHEY
GLENN H. SIEVERT
INVENTORS

BY Lyon+Lyon
ATTORNEYS

ROGER A. LONG
ROBERT A. CAUGHEY
GLENN H. SIEVERT
INVENTORS

United States Patent Office 3,308,532
Patented Mar. 14, 1967

3,308,532
METHOD AND FILLINGS FOR EXOTHERMIC BRAZING
Roger A. Long, Escondida, Robert A. Caughey, Los Angeles, and Glenn H. Sievert, El Cajon, Calif., assignors to Whittaker Corporation, a corporation of California
Filed July 29, 1963, Ser. No. 298,326
8 Claims. (Cl. 29—486)

The present invention relates to fittings which may be used to join metallic tubes, rods, and other shaped articles. More particularly, the present invention relates to a self-contained braze joint assembly which may be used to produce brazed joints simply by positioning the fitting assembly around the members which are to be joined and applying sufficient heat to cause an exothermic reaction to occur.

In conventional brazing operations, bulky and often complicated equipment requiring skilled operators is used. Typically, a torch, induction heads or the like are required to provide the necessary brazing heat. Often, considerable noise, flame and smoke accompanies the brazing operation. Thus, although these prior art methods are satisfactory for producing brazed joints as such, there has been a long recognized need for a brazing operation which would generate a minimum amount of heat and which would not require bulky equipment or skilled operators.

Thus, it is a primary object of the present invention to provide a braze joint assembly which is compact, uncomplicated and which generates a minimum amount of heat and the process of using this assembly.

It is a further object of the present invention to provide a braze joint assembly comprising a fitting, a brazing material and an exothermic material and the process of using this assembly.

It is a further object of the present invention to provide a braze joint assembly comprising a fitting, a brazing material, an exothermic material and an ignitor and the process of using this assembly.

Other objects and advantages of the present invention, it is believed, will be apparent from the following detailed description thereof when read in connection with the drawings.

Briefly, the braze joint assembly of the present invention comprises a fitting, braze material and exothermic material. The exothermic material is provided with an outer insulating covering to maximize heat in the vicinity of the braze material and minimize the heat generated to the atmosphere surrounding the assembly. In operation, the exothermic material is heated, preferably with an electric resistance ignitor, to its ignition temperature. This material then undergoes an exothermic reaction which generates sufficient heat to cause the surfaces which are to be brazed to reach the wetting temperature of the braze material. The braze material then flows between the surfaces which are to be brazed and, when the braze material has cooled, an effective brazed joint is obtained. It is to be understood that both the braze joint assembly used in this process and the process itself come within the scope of the present invention.

Referring now to the drawings, FIGURE 1 illustrates an embodiment of the braze joint assembly of the present invention before the members which are to be joined have been inserted therein.

Figure 1:
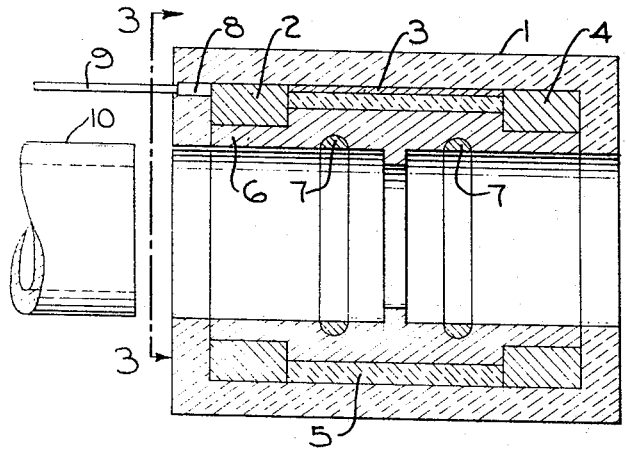

As shown in FIGURE 1, the exterior of the assembly of the present invention comprises an insulating shell 1. Insulating shell 1 may be fabricated from ceramic, inorganic fibers, or any other suitable insulating material. A ring of exothermic material 2 is positioned inside of insulating shell 1. A bridge 3 comprising exothermic material connects ring 2 with ring 4 which also comprises exothermic material. An insulating sleeve 5 is positioned adjacent to the rings of exothermic material. Fitting 6 is also positioned adjacent to the rings of exothermic material and is provided with rings 7 of brazing material. An electrical resistance ignitor 8 which is provided with leads 9 is positioned adjacent to ring 2. Also shown in FIGURE 1 are metallic tubes 10 and 11 which are to be joined by the braze joint assembly.

Figure 2:
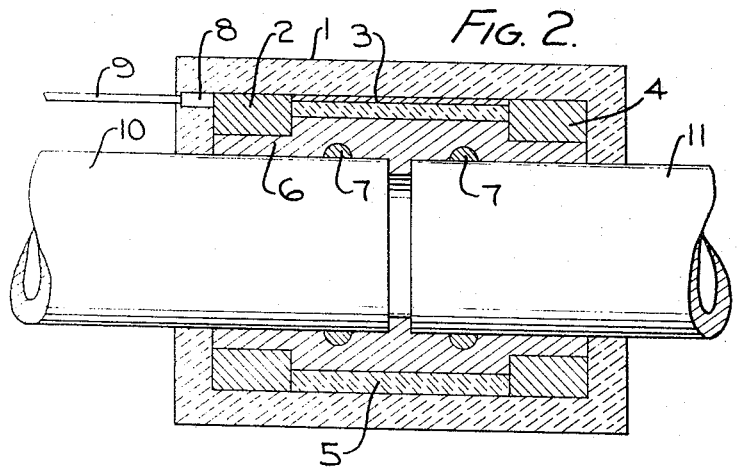
FIGURE 2 illustrates the assembly of FIGURE 1 after the members which are to be joined have been inserted therein.
Figure 3:
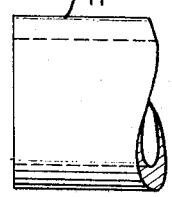
FIGURE 3 is an end-view of the assembly illustrated in FIGURE 1.
Figure 4:
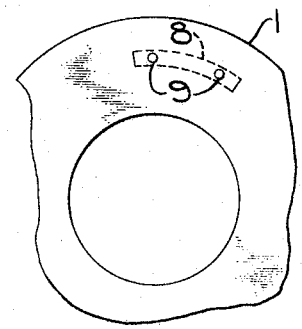
FIGURE 4 illustrates the brazed joint after the assembly illustrated in FIGURE 2 has been removed.
Figure 5:
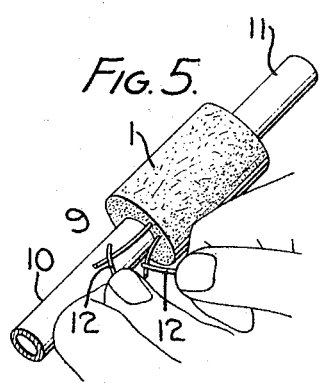
FIGURE 5 is a pictorial view of a method of igniting the exothermic material contained in the assembly of the present invention.

FIGURE 2 illustrates the same elements after tubes 10 and 11 have been inserted into the assembly. FIGURE 3 is an end-view of the assembly on line 3—3 of FIGURE 1 and illustrates insulating shell 1, ignitor 8 and leads 9. FIGURE 4 illustrates fitting 6, braze material 7 and tubes 10 and 11 after the brazed joint has been completed. FIGURE 5 illustrates ignition of ignitor 8 (not shown) by contacting leads 9 with wires 12 which connect with the terminals of a dry cell (not shown).

Figure 6:
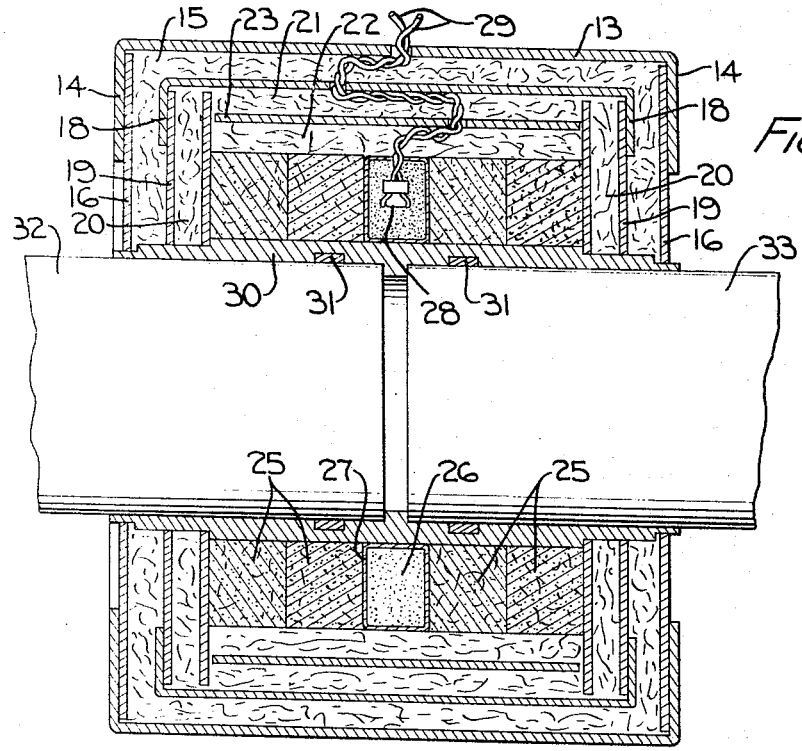
FIGURE 6 illustrates an alternate embodiment of the braze joint assembly of the present invention.

An alternate embodiment of the present invention is illustrated in FIGURE 6. In this embodiment, the insulating shell comprises a series of layers of insulating material separated by metallic dividers. The outer surface of this assembly comprises metal shell 13 which is provided with flanges 14. Preferably, shell 13 is fabricated from carbon steel. A layer of insulating material 15, preferably a fibrous material such as mullite fibers, is positioned adjacent to shell 15. Discs 16 cooperate with flanges 14 to hold the insulation 15 in place. An inner shell 17 which is provided with flanges 18 similarly cooperates with discs 19 to confine insulation 20. Insulating layers 21 and 22 are separated by metallic tube 23. Discs 24 are positioned at each end of tube 23. This composite insulating shell surrounds rings 25 which comprise a pressed exothermic material. An ignition ring comprising powdered exothermic material 26 sealed in metal foil 27 is positioned between the two inner-most rings 25. An ignitor 28, preferably a tungsten ignition bridge, is positioned in exothermic powder 26 and is provided with leads 29.

Fitting 30 is positioned adjacent to exothermic rings 25 and is provided with rings 31 which comprise a brazing material. Metallic tubes 32 and 33 which are to be joined by the brazing assembly are also illustrated.

Figure 7:
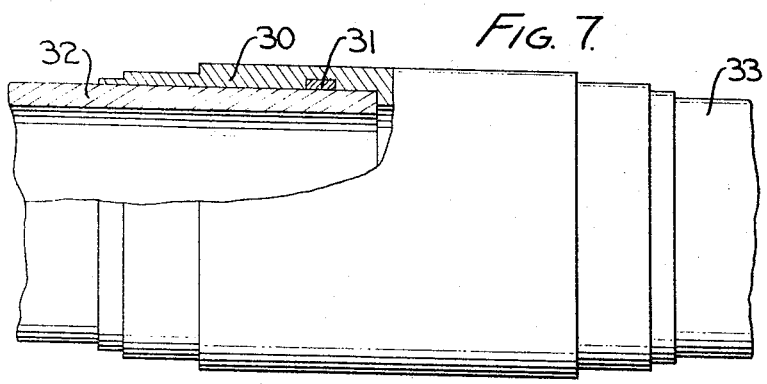
FIGURE 7 illustrates the brazed joint produced by the assembly illustrated in FIGURE 6.

FIGURE 7 illustrates the brazed joint formed by the assembly illustrated in FIGURE 6 after all of the assembly other than fitting 30 and brazing material rings 31 have been removed.

In operation, the assembly of the present invention is simply positioned around the members which are to be joined, e.g., as shown in FIGURES 2 and 6. The leads connected to the ignitor, i.e., elements 9 in FIGURE 2 and elements 29 in FIGURE 6, are then connected to a suitable power source, e.g., a two- or six-volt battery depending upon the type of ignitor which is used. The current passed through the ignitor causes it to reach a temperature sufficient to ignite the exothermic material which surrounds it. Once ignited, the exothermic material undergoes an exothermic reaction which generates a substantial amount of heat sufficient to cause the surfaces of the interface between the members to be joined and the fitting to reach the wetting temperature of the braze material thereby causing the braze material to flow in the interface. In this regard, it is important to note that it is not sufficient to simply bring the braze material to a temperature at which it is molten without bringing the surfaces at the interface to the wetting temperature of the braze material since the braze material will not flow in the interface unless its wetting temperature is reached.

Any suitable exothermic and brazing materials may be used in the present invention. For example, the exothermic and brazing materials disclosed in co-pending applications Serial Nos. 686,870, filed September 30, 1957; Serial No. 2,829, filed January 18, 1960, and Serial No. 255,663, filed February 1, 1963, each of which applications is filed in the name of Roger A. Long, one of the inventors herein, the disclosures of which co-pending applications are incorporated by reference herein, may be used. The choice of these materials, will, of course, depend in part upon the particular base metals which are to be joined. The brazing and exothermic materials should be chosen such that the base metals will not undergo physical or metallurgical damage during the exothermic reaction. Since the exothermic reaction employed in the present invention causes the base metals to be subjected to high temperatures for only short times, maximum temperatures higher than those conventionally considered permissible may be used in the present invention.

Mullite fibers are preferred as the insulation material used in the present invention, but any other suitable insulation may be used. In the embodiment illustrated in FIGURE 6, it is preferred to fabricate the metal sheets and discs from carbon steel. However, other suitable materials such as aluminum may be used. These sheets and discs function to effectively prevent the gas generated by the exothermic material from penetrating the insulation. In addition, these sheets and discs function to reflect some of the heat generated by the exothermic material thereby increasing the efficiency of the heat transfer.

A thin sheet of a material which has a very high heat conductivity, e.g., copper or nickel, or a very high melting point, e.g., tantalum or molybdenum, may be positioned between the exothermic material and the outer surface of the fitting. This sheet functions to facilitate removal of the exothermic and insulating materials from the fitting after the exothermic materials have been fired.

The ignitor which is used in the present invention should be capable of generating a sufficient amount of heat to cause ignition of the exothermic material used. Although electric resistance ignitors have been specifically described and illustrated, it will be readily apparent to those skilled in the art that other types of ignitors may be used.

In general, it is preferred to use exothermic materials which have an ignition temperature of less than about 1200° F. This temperature is not to be considered an absolute maximum, but it has been found that greater reliability is achieved when ignition occurs below this temperature. A preferred exothermic material has the following composition expressed in weight percent:

| | |
|---|---|
| Magnesium | 19.90 |
| Nickel oxide | 51.84 |
| Manganese oxide | 18.24 |
| Aluminum | 4.24 |
| Manganese dioxide | 5.36 |

This exothermic material has an ignition temperature of about 1100° F. When 30 grams of this material was used in an assembly such as that illustrated in FIGURE 2 wherein the fitting comprised stainless steel having an inside diameter of about 1.01 inches and a thickness of about 0.04 inch, it was found that the maximum temperature reached on the inside of the tube at the middle of the fitting was about 2,000° F. The total time from ignition to maximum temperature was about 35 seconds. When Lithobraze BT (manufactured by Hardy & Harman) was used as the brazing material in this assembly, an effective braze was achieved. In the embodiment shown in FIGURE 1, exothermic ring 2 is ignited first followed by bridge 3 and then exothermic ring 4.

The fittings used in the present invention may comprise any suitable metal, e.g., monel, copper, brass, ferrous metals, etc.

Brazes which contain flux as well as fluxless brazes may be used in the present invention. When fluxless brazes are used, it is usually necessary to use a relatively greater amount since the heat transfer is facilitated by the presence of flux. In those cases where it is desired to eliminate contamination of the interior of tubes which are being joined, fluxless brazes are indicated. In addition, contamination may also be decreased or eliminated by flooding the interior of the tubing with an inert gas such as argon.

As is well known to those skilled in the art, brazing is also defined as a welding process wherein the bonding metal is a nonferrous metal or alloy whose melting point is higher than 900° F., but lower than that of the metals or alloys to be joined. In exothermic brazing, the melting point of the brazing composition may even exceed that of the base metals because of the extremely short time at which the brazing composition is at its melting temperature. Because of the presence of the insulation in the braze joint assembly of the present invention, this assembly may be used within extremely short distances, e.g., on the order of one inch, from heat sensitive surfaces. This is a distinct advantage in many environments.

The assemblies of the present invention may be made in almost any size. Exothermic materials which are chemically neutral and completely stable are readily available. Thus, the assemblies of the present invention may be prepared such that they have an almost infinite shelf life.

Although the fittings which are used in the present invention are comparatively small, extremely high strengths may be attained. Strengths of up to 18,500 p.s.i. and higher have ben obtained with the fittings of the present invention. Thus, the fittings of the present invention combine the very desirable properties of small size, light weight and high strength which make them especially suitable for forming joints in hydraulic tubing.

It will be readily apparent to those skilled in the art that changes in the amounts and types of materials used in the present invention will change the heat relationships of these materials. Thus, in a given assembly, a change in the type or amount of insulating material, brazing material, exothermic material, fitting or pieces to be joined will usually require a corresponding change in one or more of the other components of the assembly. However, given the concept of the present invention, only routine experimentation is required to determine the most suitable type and amount of material to be used.

Having fully described the present invention, it is to be understood that it is not to be limited to the specific details set forth, but is of the full scope of the appended claims.

We claim:

1. An article of manufacture comprising a metal fitting, a brazing material positioned in each of at least two cavities in the inner surface of said fitting, at least two monolithic bodies of exothermic material in contact with the outer surface of said fitting but spaced from each other along a portion of said fitting, said monolithic bodies being disposed to give uniform heating of said fitting to reach the flow temperature of said brazing material and ignition means bridging said monolithic bodies to permit substantially simultaneous ignition of said monolithic bodies.

2. An article of manufacture comprising a metal fitting, a brazing material positioned in each of at least two cavities in the inner surface of said fitting, at least two monolithic bodies of exothermic material in contact with the outer surface of said fitting but spaced from each other along a portion of said fitting, said monolithic bodies being disposed to give uniform heating of said fitting to reach the flow temperature of said brazing material, ignition means bridging said monolithic bodies to permit substantially simultaneous ignition of said monolithic bodies, and insulating material surrounding said monolithic bodies.

3. The assembly of claim 2 wherein said insulating material is provided with at least one metallic shell.

4. The assembly of claim 2 wherein said means for igniting comprises an electric resistance heater.

5. The method of uniting two metal pieces comprising placing at the joint of said metal pieces a brazing metal assembly comprising a metal fitting which surrounds said joint, brazing material positioned in each of at least two cavities in the inner surface of said fitting at least two monolithic bodies of exothermic material in contact with the outer surface of said fitting but spaced from each other along a portion of said fitting, said monolithic bodies being disposed to give uniform heating of said fitting to reach the flow temperature of said brazing material, and an ignitor, igniting said monolithic bodies of exothermic material substantially simultaneously whereby the brazing material is caused to flow in the interface between said fitting and said pieces, and allowing said fitting to cool whereby a brazed joint is produced.

6. The method of claim 5 wherein said igniting step comprises causing a current to pass through an electric resistance heater.

7. The method of uniting two metal pieces comprising placing at the joint of said metal pieces a brazing assembly comprising a metal fitting which surrounds the joint, brazing material positioned in each of at least two cavities in the inner surface of said fitting, at least two monolithic bodies of exothermic material in contact with the outer surface of said fitting but spaced from each other along a portion of said fitting, said monolithic bodies being disposed to give uniform heating of said fitting to reach the flow temperature of said brazing material, a bridge of exothermic material joining the two monolithic bodies to permit substantially simultaneous ignition thereof, and means for igniting said exothermic material; igniting the monolithic bodies of exothermic material whereby said brazing material is caused to flow in the interface between said fitting and said pieces, and allowing said fitting to cool whereby a brazed joint is produced.

8. The method of claim 7 wherein said heating step comprises causing a current to pass through an electric resistance heater.

References Cited by the Examiner

UNITED STATES PATENTS

| Re. 13,219 | 3/1911 | Chapman | 29—498.5 |
| 1,355,224 | 10/1920 | Gravell | 29—498.5 |
| 2,569,956 | 10/1951 | Schiltknecht | 29—501 |
| 2,667,865 | 2/1954 | Herman | 228—56 |
| 2,745,368 | 5/1956 | Klein | 228—56 |
| 3,107,421 | 10/1963 | Trunbull | 29—474.4 |

JOHN F. CAMPBELL, *Primary Examiner.*

WHITMORE A. WILTZ, CHARLIE T. MOON,
*Examiners.*

P. M. COHEN, *Assistant Examiner.*